(No Model.)

A. C. EVANS.
ENDLESS CABLE RAILWAY.

No. 304,306. Patented Sept. 2, 1884.

Attest
S. B. Clemmons
J. A. Bumgardner

Inventor
Austin C. Evans
B. C. Converse
atty (No Model.)   3 Sheets—Sheet 2.
A. C. EVANS.
ENDLESS CABLE RAILWAY.
No. 304,306.   Patented Sept. 2, 1884.
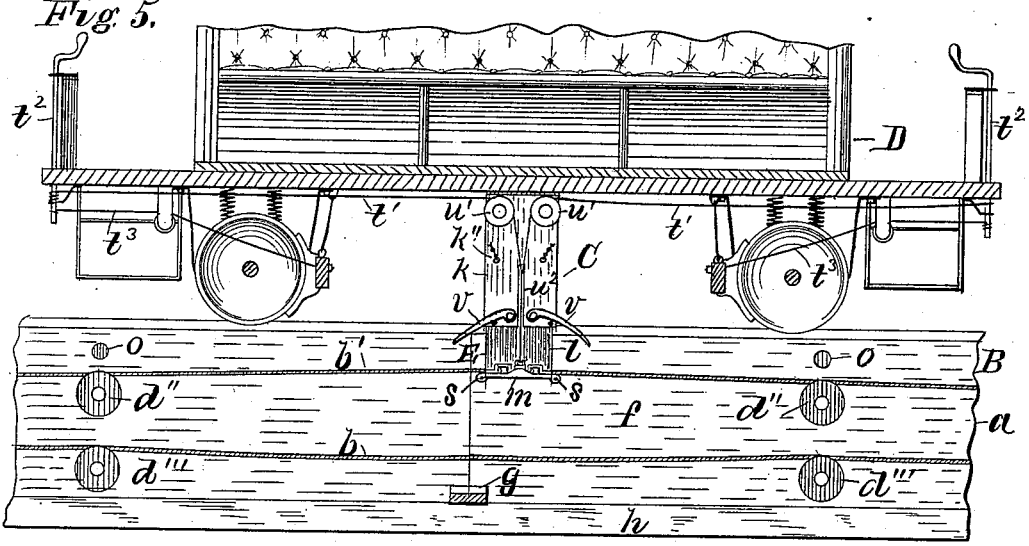
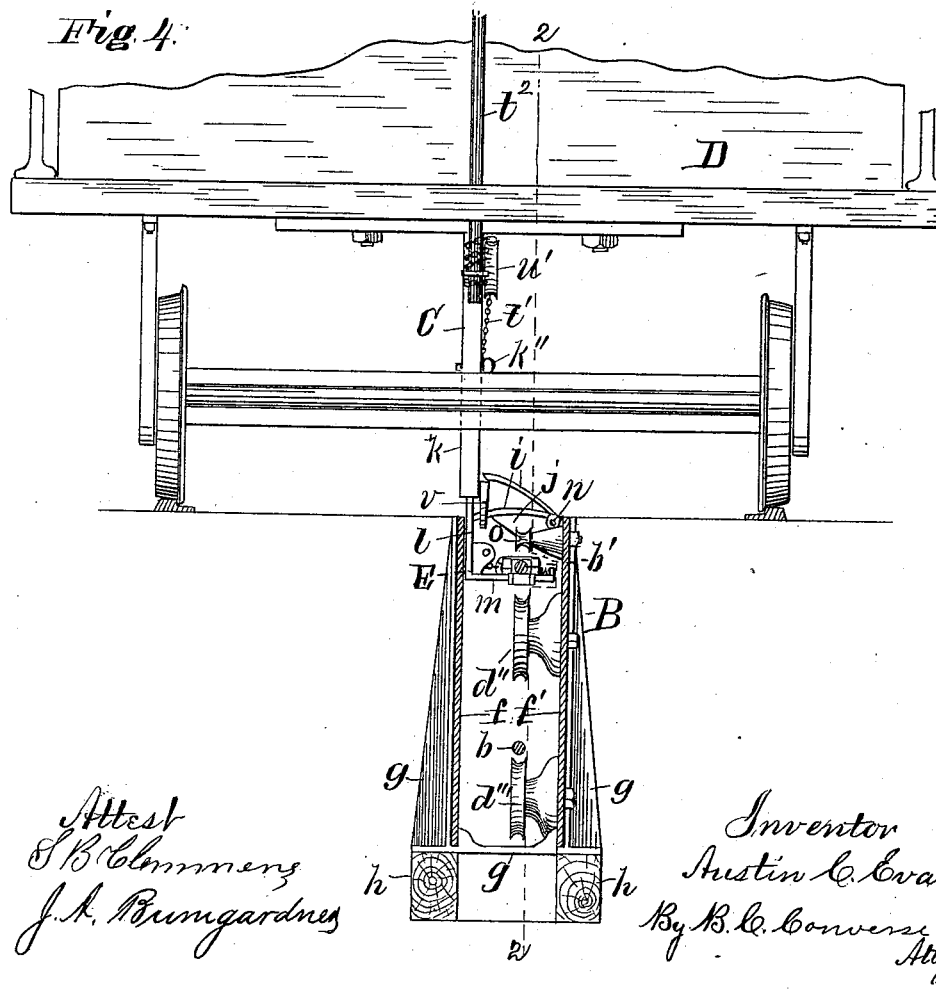
Attest
S. B. Clemmens
J. A. Bumgardner
Inventor
Austin C. Evans
By B. C. Converse
Atty

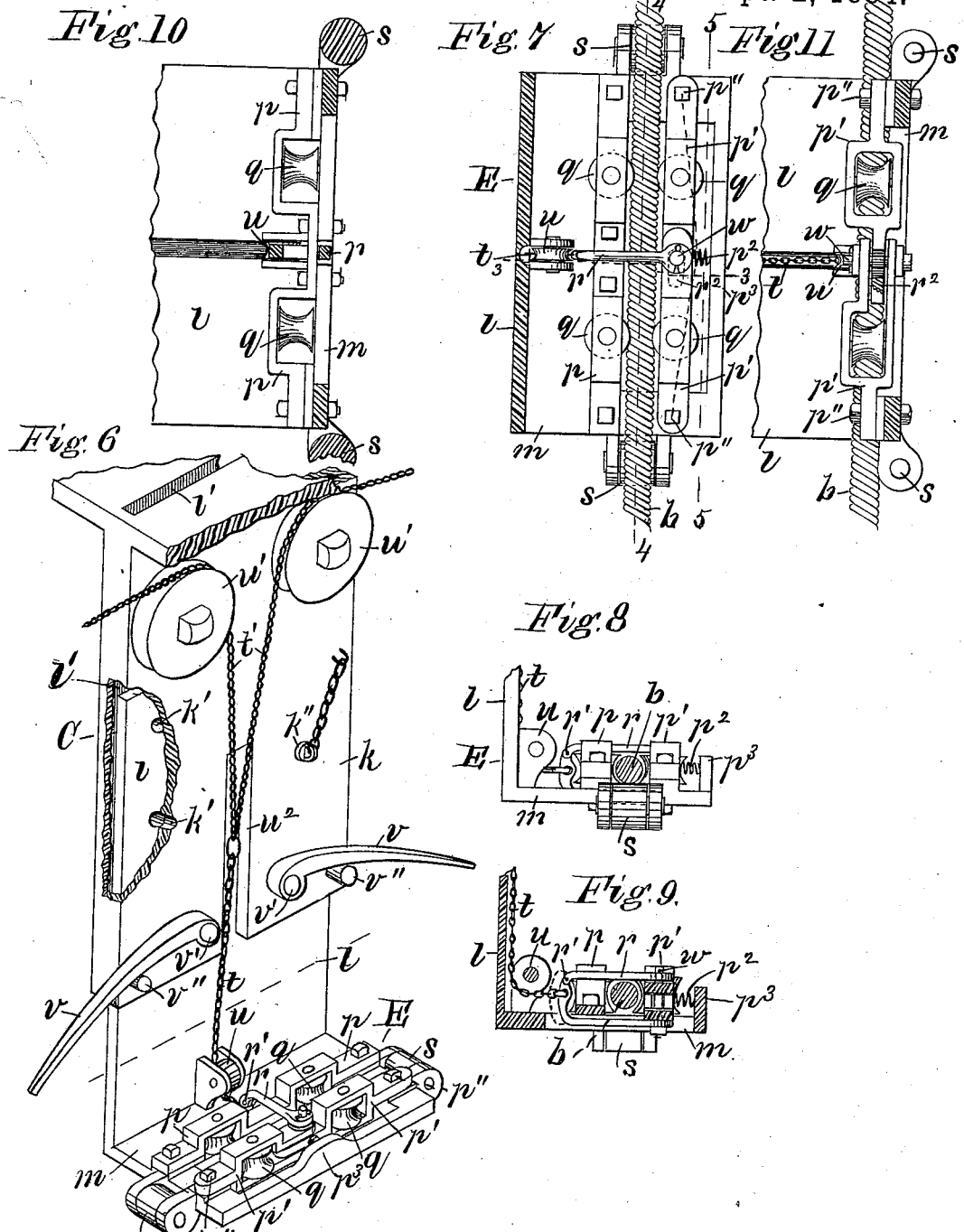

UNITED STATES PATENT OFFICE.

AUSTIN C. EVANS, OF SPRINGFIELD, OHIO.

ENDLESS-CABLE RAILWAY.

SPECIFICATION forming part of Letters Patent No. 304,306, dated September 2, 1884.

Application filed February 13, 1884. (No model.)

*To all whom it may concern:*

Be it known that I, AUSTIN C. EVANS, a citizen of the United States of America, residing at Springfield, in the county of Clark and State of Ohio, have invented certain new and useful Improvements in Endless-Cable Railways, of which the following is a specification, reference being therein had to the accompanying drawings.

My invention relates to improvements in endless-cable railways; and it consists in certain improvements in the construction of the tube and the means for supporting the movable lids or covers of the same; also, in the adaptation of an underground tube for a cable running in separate horizontal but in the same vertical plane. The bearing-pulleys in main lines are attached on one side of the tube, one set or series of pulleys being placed above the other. These pulleys are grooved, while in turn-outs, sidings, switches, &c., the pulleys bearing the cable are made in the form of cylinders, and extend entirely across the tube, to allow the cable to be shifted from one side to the other by the gripper at the intersections of said sidings, &c., with the main line.

My invention further consists in the construction of the gripper, and in the mode of operating the same with a cable running in two separate parallel planes. No turn-tables are used in this mode of operating single-track endless-cable railways, the gripper being operated on the same side of the tube, when attached to either the upper or lower section of the cable.

Figure 1:
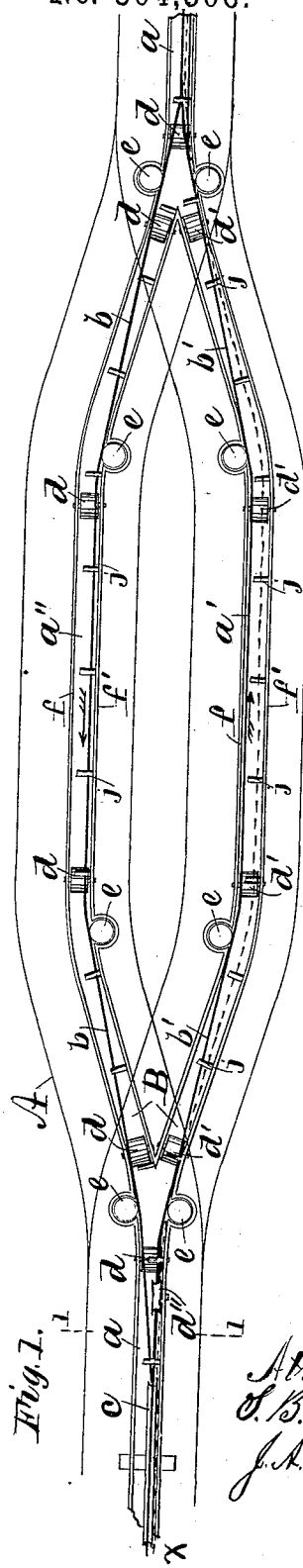
Figure 2:
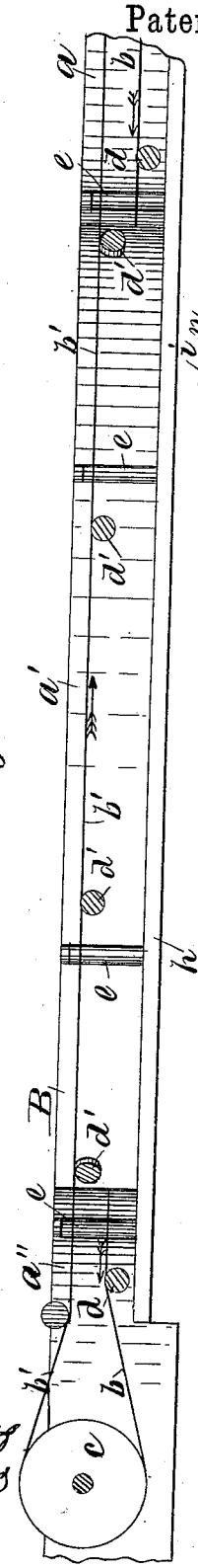
Figure 3:
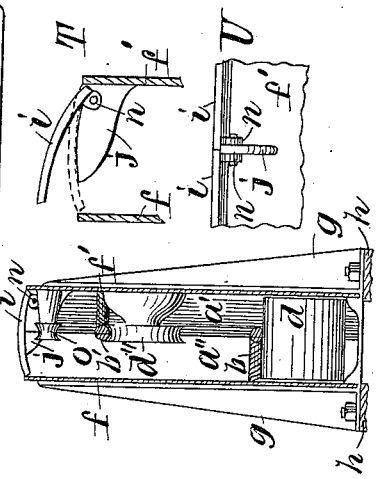

Figure 1 is a plan view of a turn-out in a single-track endless-cable railway, the upper and lower sections of the cable running in separate horizontal planes. The tube in this view is shown with its covers or lids removed. Fig. 2 is a vertical longitudinal section of the same through the dotted line $x$, Fig. 1. Fig. 3 is a cross-section through line 1 1, Fig. 1, looking toward the right. Fig. 4 is an end view of the car and a cross-section through the tube of the main line. Fig. 5 is a vertical longitudinal section through line 2 2, Fig. 4. Fig. 6 is an isometric view of the gripper and its connections. Fig. 7 is a top view of the gripper in engagement with the cable. Fig. 8 is an end view of the same. Fig. 9 is a cross-section of the same part through line 3 3, Fig. 7. Fig. 10 is vertical longitudinal section through line 4 4 of Fig. 7, (with the cable removed,) showing the left or fixed section of the gripper; and Fig. 11 is a vertical longitudinal section through line 5 5 of the same figure, and shows the right or jointed section of the gripper.

A, Fig. 1, represents a turn-out in a single-track endless-cable railway; B, the tube in the same. The side walls of the latter are vertical and parallel, and it is covered by a series of plates, $i$, hinged upon one side; when closed, these covering-plates are supported by brackets $j\ j$, which extend from one side wall, $f'$, nearly across the tube at the top, leaving only sufficient space at the opposite side to allow the bar which carries the gripper to pass them.

By reference to Fig. 3 and the details T and U of the same, it will be seen that the lids $i$ are hinged by ears $n$ to the brackets $j$, near the junction of the latter with the side wall, $f'$; and in the view of tube B, Fig. 4, the position of the gripper with relation to the side wall, $f'$, the bearing-pulleys, the brackets $j$, and the lid-sections $i$ is shown, one of the latter being seen as elevated by the front dog, V, of the gripper. In this view the car D, with its gripper in engagement with the upper cable, $b'$, is shown as moving point-blank from the spectator. The cable is lifted by the gripper E from its bearing-pulley $d''$, the position of the operative parts being the same as seen in the view Fig. 5, with the car D moving toward the right. In the latter view the lids $i$ and brackets $j$ are removed. The relative positions of the two parts $b$ and $b'$ of the cable can be seen. The part $a$ of the tube B here shown is on the main or straight line of the same. In the view Fig. 1 the lower cable, $b$, moves through the upper siding, $a''$, of the turn-out, while the upper cable, $b'$, moves in the opposite direction through the lower siding, $a'$, as seen by the arrows. The lower cylindrical pulleys, $d$, bear the cable $b$, and the upper cylindrical pulleys, $d'$, bear the cable $b'$. Cylinders $e$ (seen standing vertically in Figs. 1 and 2) on either side of the tube prevent the cable-sections $b$ and $b'$ from being chafed against the side walls.

In Figs. 4, 5, and 6, C is a broad flat pendant, which is suspended from the bottom of the car D, midway between its trucks. This pendant consists of the hollow sleeve $k$, reaching down quite to the top of the tube B, and having a vertical hole, $l'$, through the same, within which the broad thin bar $l$ slides freely up and down. The foot end M of this bar extends at right angles from the perpendicular part nearly across the tube B, and on this foot-piece is bolted the gripper proper, E. This consists of the two parallel frame-bars $p$ and $p'$, each being bent to form separate rectangular boxes or frames for the horizontal sheaves $q\ q$, of which there are four—two in each frame-bar on either side of the line of the cable. The inner frame-bar, $p$, is stationary, while the outer one, $p'$, is in two parts, being connected in the middle by a joint, and pivoted by a vertical bolt, $w$, as seen in Figs. 7, 9, and 11. This bolt pivots the overlapped ends of the two parts of this frame-bar and the ends of a hinged clevis, $r$, (which straddles the middle of the gripper,) together. An oblong hole in the pivoted end of one of the bars $p'$, through which the bolt extends, allows the bar to be flexed or bent inward, so as to bring its two sheaves tightly against the cable when the gripper is operated. A spring, $p^2$, seen between the jointed frame-bar $p'$ and the upturned flange $p^3$ on the end of foot $m$, retracts so as to throw the bar $p'$ out of line and away from the cable when the gripper is released. The clevis $r$ is in two parts, being hinged at the bow by a pivot, $r'$, the object being to allow the upper limb to be loosed from bolt $w$, and raised, so that the cable can be lifted out when changing the gripper from one section of the cable to the other. At either end of the gripper are bearing-rollers $s\ s$, upon which the cable runs, too keep it off the foot-plate.

In the angle formed by the foot $m$ is a friction-roller, $u$, pivoted on a horizontal shaft in upright ears extending from the bar $l$ to give direction to the chain $t$, which has its end secured to the bow of clevis $r$, and extends therefrom under the pulley $u$, and thence up the middle of the pendant C a short distance, when it forks, and the two connecting-chains $t'$ extend in opposite directions over the two bearing-pulleys $u'\ u'$ on the side of the pendant, near the top of the same, until they reach the ends of the car, where they are connected with the lower end of the vertical crank-shaft $t^2$, as seen in the view Fig. 5. By turning either of these the gripper is engaged with and disengaged from the cable.

In shifting the gripper from the upper to the lower strand of the cable, the gripper-bar is extended until its foot end reaches the lower strand, and the cable is then passed up around the end of the foot and dropped into its place of engagement. In shifting the gripper from the lower to the upper strand of the cable, the latter is lifted out, passed down over the foot end of the gripper, and dropped into the bearing-pulleys below the latter, which is then elevated and brought into engagement with the upper strand. Sufficient space is left between the end of the gripper-foot and the side wall of the tube to allow the cable to be passed in either direction. The bar $l$ can be raised and lowered and held in adjustment by pins $k''$, which are inserted in holes $k'$, extending through sleeves $k$ and the bar $l$, as seen in Figs. 5 and 6.

To prevent the chain $t$ from wear, a vertical slot, $u^2$, is made in the central part of the sleeve $k$, extending from its lower end about half its length upward.

To provide for raising the lids $i$ as the car moves along in either direction, two inclined levers or dogs, $v\ v$, extend outward and downward over the line of the tube in opposite directions from either side of the slot $u^2$ on the side of the sleeve $k$, their inner ends being pivoted upon a journal, $v'$, extending outward from said sleeve. They are supported upon horizontal studs $v''$. The object of pivoting these dogs is to allow them to be thrown up out of the way of the lids when the gripper is out of the tube, and the car disengaged from the cable and moved along the track by other means. Unlike the gripper in common use, this can be operated from either end of the car.

By reference to Fig. 1 it will be noticed that the horizontal cylindrical pulleys $d$ and $d'$ will allow the cable to be slipped over from one side to the other of the tube in the turn-outs by means of the gripper with ease and without abrasion, whereas such shifting cannot be accomplished over grooved pulleys attached to one side of tube without danger of cable falling outside of the pulley when dropped by the gripper, and would also be subject to a sudden jerk when taken out of the pulley.

I claim as my invention—

1. In an endless-cable railway, an underground tube having a series of bearing-pulleys in the upper part of the same, supporting an endless cable running in one direction, and a series of pulleys in the lower part of said tube supporting the lower section of the same cable running in the opposite direction, the upper and lower sections of said cable and both series of pulleys being in the same vertical plane, but each section of said cable and the series of bearing-pulleys supporting the same being operated in a separate horizontal plane, as and for the purpose set forth.

2. In an underground tube for endless-cable railways, wherein the cable is run in opposite directions in the same vertical plane, the combination, with said cable and tube, of the two series or sets of pulleys (one set being above the other) adapted to support said cable, running in opposite directions in two separate horizontal planes, as and for the purpose set forth.

3. In an underground tube for endless-cable railways, having lid-sections hinged thereto on one side, the combination therewith of the brackets extending from one of the side walls of said tube at the top of the same, for the purpose of supporting said lid-sections, as set forth.

4. The combination, with the tube B, having the series of pulleys $d''$, pivoted upon axles extending from the side wall, $f'$, in the upper plane of the same, and the series of pulleys, $d'''$, pivoted upon axles extending from the same side wall in the lower plane of said tube in the same vertical plane with pulleys $d''$, of the cable, supported and operated over the two series of said pulleys, in two separate horizontal planes, in opposite directions.

5. The combination of the tube, the two series of pulleys located as described, the cable supported and operated thereon, the brackets, the lids hinged to the latter and supported by said brackets, and the gripper with its auxiliary operative devices, and having the dogs pivoted upon the pendant of the same, adapted to elevate the hinged lids of the tube when the car is run in either direction, as set forth.

6. The combination, with a car adapted for an endless-cable railway having a vertically-arranged cable, said car to be run in either direction, as described, of a gripper suspended therefrom, and means for extending the same for the purpose of engaging the lower cable-strand and for retaining it when elevated and in engagement with the upper cable-strand, said gripper being connected with levers at either end of said car, and adapted to be operated as set forth.

7. A gripper consisting of two parallel frame-bars, with horizontal pulleys pivoted therein opposite to each other on either side of the cable-line, one of said bars being in two separate parts and pivoted at the ends and in the middle part, whereby it may be flexed to cause its pulleys to engage the cable, a clevis hinged at its bow end, straddling said parallel bars, pivoted in common with said jointed bar, and having its bow end connected, by a chain or other equivalent means, with a crank or brake shaft at either end of the car, whereby it may be operated in engaging and disengaging the cable.

8. In a cable-gripper, a rigid frame-bar on one side of the cable-line, and a two-part pivoted frame-bar on the opposite side of the same, both provided with horizontal pulleys, a two-part clevis extending at right angles across a cable-line and straddling said frame-bars, and having its ends pivoted to said jointed bar, said clevis being connected by a forked chain with the brake-levers at either end of the car, for the purpose set forth.

9. In a cable-gripper having horizontal pulleys pivoted in frame-bars on either side of the cable-line, the combination of a rigid and a flexible frame-bar, the latter being pivoted at its opposite ends, jointed in the middle, and provided with means connected therewith for flexing it in engaging the cable, as set forth.

10. The combination, with the stationary frame-bar $p$, having pulleys $q\ q$, of the frame-bar $p'$, having pulleys $q\ q$, pivot-bolts $p''$ at the opposite ends of the same, a vertical oblong hole, $r^2$, in the joint end of one section, clevis $r$, and pivot-bolt $w$, connecting said clevis and the joint ends of the bar $p'$ together.

11. The combination, with gripper E, consisting of the stationary frame-bar $p$, the pivoted frame-bar $p'$, hinged at the center, both bars having pulleys $q\ q$, of the two-part clevis $r$, pivoted at the bow end by pin $r'$, and straddling said frame-bars across the line of the gripper and cable, and having the pin $w$, pivoting the hinged bar $p'$ and the ends of said clevis together, as and for the purpose set forth.

12. The combination, with the vertically-arranged cable, of the extensible grip-bar and means for gripping the cable.

13. In an underground cable railway, wherein the cable is run in opposite directions in the same vertical plane, the combination, with the tube and cable, of a car having a pendent grip-bar, means for extending the same and for gripping the cable.

14. In curves and turn-outs for an endless-cable railway in which the cable is arranged in a vertical plane, the combination, with the vertically-arranged cable and the tube, of the vertical and horizontal cylindrical rollers, having their surfaces at right angles with each other and grouped in pairs, one vertical and one horizontal roller near together as described, for the purpose set forth.

15. The pivoted dogs $v\ v$, in combination with the pendant C of the gripper and the hinged lids $i$ of the tube B, said dogs being adapted to engage said lids and elevate them when operated, and to be thrown up out of the way when the car is disconnected from the cable.

In testimony whereof I affix my signature in presence of two witnesses.

AUSTIN C. EVANS.

Witnesses:
B. C. CONVERSE,
G. M. GRIDLEY.